US008678919B2

(12) United States Patent
Blackburn et al.

(10) Patent No.: US 8,678,919 B2
(45) Date of Patent: Mar. 25, 2014

(54) SCHEDULING OF RECONFIGURABLE GAMING MACHINES

(75) Inventors: Christopher W. Blackburn, Reno, NV (US); Robert T. Davis, Carson City, NV (US); Christopher J. Frattinger, Sparks, NV (US); Timothy J. Holman, Chicago, IL (US); Suzanne J. Ruebusch, Cincinnati, OH (US); Terry D. Warkentin, Carson City, NV (US)

(73) Assignee: WMS Gaming Inc., Waukegan, IL (US)

( * ) Notice: Subject to any disclaimer, the term of this patent is extended or adjusted under 35 U.S.C. 154(b) by 831 days.

(21) Appl. No.: 11/991,392

(22) PCT Filed: Aug. 25, 2006

(86) PCT No.: PCT/US2006/033194
§ 371 (c)(1),
(2), (4) Date: Dec. 15, 2008

(87) PCT Pub. No.: WO2007/032881
PCT Pub. Date: Mar. 22, 2007

(65) Prior Publication Data

US 2009/0156313 A1 Jun. 18, 2009

Related U.S. Application Data

(60) Provisional application No. 60/715,754, filed on Sep. 9, 2005.

(51) Int. Cl.
*A63F 13/12* (2006.01)
*G06F 3/048* (2013.01)
*G06Q 10/00* (2012.01)

(52) U.S. Cl.
USPC ............. 463/29; 434/108; 700/100; 715/963; 705/7.12; 705/7.13; 705/7.16; 705/7.18

(58) Field of Classification Search
USPC ................ 705/7.12, 7.13, 7.16, 7.18; 463/29; 434/108; 700/100; 715/963
See application file for complete search history.

(56) References Cited

U.S. PATENT DOCUMENTS 6,038,625 A * 3/2000 Ogino et al. .................. 710/104
6,354,943 B1 * 3/2002 Miura ............................. 463/29

(Continued)

FOREIGN PATENT DOCUMENTS

GB 2399765 A * 9/2004 .............. A63F 13/00
WO WO 2005/026909 3/2005 .............. A63F 13/00

OTHER PUBLICATIONS

Nick Parlante, "Pointers and Memory," 1998-2000, available at http://cslibrary.stanford.edu/102/PointersAndMemory.pdf.*

(Continued)

*Primary Examiner* — Arthur O. Hall
*Assistant Examiner* — Bach Hoang
(74) *Attorney, Agent, or Firm* — Nixon Peabody LLP

(57) ABSTRACT

A controller of gaming machines that permit wagering on wagering games includes a first memory location that stores a first time-based schedule of gaming actions to be taken by the gaming machines that are located remote from the controller. A second memory location stores identities of first gaming machines. One of the first and second memory locations stores a pointer that links the other of the first and second memory locations and associates the first gaming machines with the first schedule so that one of the first schedule and first gaming machines can be modified independent of and without modifying the other of the first schedule and the first gaming machines. A data transmitter transmits instructions corresponding to the gaming actions defined by the first schedule to the first gaming machines.

29 Claims, 7 Drawing Sheets

(56) References Cited

U.S. PATENT DOCUMENTS

| | | | | |
|---|---|---|---|---|
| 6,605,003 | B2 * | 8/2003 | Suchocki et al. | 463/29 |
| 6,806,889 | B1 * | 10/2004 | Malaure et al. | 715/733 |
| 6,840,859 | B2 * | 1/2005 | Cannon et al. | 463/30 |
| 7,337,330 | B2 * | 2/2008 | Gatto et al. | 713/191 |
| 7,775,871 | B2 * | 8/2010 | Nelson | 463/16 |
| 8,393,960 | B2 * | 3/2013 | Anderson et al. | 463/31 |
| 2002/0172192 | A1 * | 11/2002 | Hunzinger et al. | 370/352 |
| 2004/0005925 | A1 | 1/2004 | Yamagishi | 463/40 |
| 2004/0198496 | A1 * | 10/2004 | Gatto et al. | 463/42 |
| 2004/0235563 | A1 * | 11/2004 | Blackburn et al. | 463/29 |
| 2004/0243600 | A1 * | 12/2004 | Ikeda et al. | 707/100 |
| 2005/0192099 | A1 * | 9/2005 | Nguyen et al. | 463/42 |
| 2005/0282637 | A1 * | 12/2005 | Gatto et al. | 463/42 |
| 2006/0046824 | A1 * | 3/2006 | Silva et al. | 463/16 |
| 2006/0063575 | A1 * | 3/2006 | Gatto et al. | 463/1 |
| 2007/0026935 | A1 * | 2/2007 | Wolf et al. | 463/25 |

OTHER PUBLICATIONS

Nick Parlante "Linked List Basics," 1998-2001, available at http://cslibrary.stanford.edu/103/LinkedListBasics.pdf.*

International Search Report mailed Feb. 15, 2007 issued in corresponding International Patent Application No. PCT/US2006/033194 (6 pages).

Written Opinion mailed Feb. 15, 2007 issued in corresponding International Patent Application No. PCT/US2006/033194 (6 pages).

* cited by examiner

100

| | SCHEDULE # | SCHEDULE NAME / DESCR. | GAME ID. | PARAMETER 1 | PARAMETER N | DATE / TIME |
|---|---|---|---|---|---|---|
| 102 → | 31 | RECURRING WEEKDAY #1 | G7 | | | D=1-5 T=0600-1800 |
| 104 → | 35 | THURS. NIGHT SPECIAL | G11 | | | D=4 T=1800-2400 |
| 106 → | | | | | | |
| | ↑ 108 | ↑ 110 | ↑ 112 | ↑ 114 | ↑ 116 | ↑ 118 |

SCHEDULING OF RECONFIGURABLE GAMING MACHINES

CROSS-REFERENCE TO RELATED APPLICATIONS

This application is a U.S. National Stage of International Patent Application No. PCT/US2006/033194, filed on Aug. 25, 2006, which claims the benefit of U.S. Provisional Patent Application Ser. No. 60/715,754, filed on Sep. 9, 2005, both of which are incorporated herein by reference in their entireties.

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention relates generally to the management and control of gaming machines that support wagering on wagering games, and more particularly to controlling schedules and configurations of remotely reconfigurable gaming machines.

BACKGROUND OF THE INVENTION

Gaming machines, such as slot machines and video poker machines, have been a cornerstone of the gaming industry for several years. Generally, the popularity of such machines with players is dependent on the likelihood (or perceived likelihood) of winning money at the machine and the intrinsic entertainment value of the machine relative to other available gaming options. Different players, changing popularity of types of games, geographic location of a gaming machine on a casino floor, time of day and day of the week may cause players to be attracted to different types of gaming machines. Shrewd operators consequently strive to monitor the amount of play of different types of gaming machines and manage the availability of different games to attract frequent play and hence increase profitability to the operator. Therefore, there is a continuing need for gaming machine manufacturers to continuously develop new techniques for managing different games and gaming features on remotely reconfigurable gaming machines to maximize frequent play.

A centralized gaming controller can cause remote gaming machines to be reconfigured to provide different games and/or variations of games. Such as system permits the operator to easily change a gaming machine (remote terminal) from one game to another as well as varying characteristics of a game. This gives the operator an opportunity to advantageously change the games being offered to the players to maximize play. However, controlling a variety of schedules for a plurality of gaming machines can be cumbersome and prone to implementation errors especially when new schedules or gaming machines are to be added or deleted.

SUMMARY OF THE INVENTION

According to one aspect of the present invention, a controller of gaming machines that permit wagering on wagering games includes a first memory location that stores a first time-based schedule of gaming actions to be taken by the gaming machines that are located remote from the controller. A second memory location stores identities of first gaming machines. One of the first and second memory locations stores a pointer that links the other of the first and second memory locations and associates the first gaming machines with the first schedule so that one of the first schedule and first gaming machines can be modified independent of and without modifying the other of the first schedule and the first gaming machines. A data transmitter transmits instructions corresponding to the gaming actions defined by the first schedule to the first gaming machines.

According to another aspect of the invention, a method is provided for controlling gaming machines that permit wagering on wagering games and includes storing in memory time-based schedules, including a first schedule, of gaming actions to be taken by the gaming machines. Identities of first gaming machines are stored in memory. The identities of the first gaming machines are linked with the first schedule so that one of the first schedule and the identities of the first gaming machines can be modified independent of and without modifying the other of the first schedule and the identities of the first gaming machines. Instructions corresponding to the gaming actions defined by the first schedule are transmitted to the first gaming machines.

According to yet another aspect of the invention, a computer readable storage medium is encoded with instructions for directing a gaming controller to perform the above method.

Additional aspects of the invention will be apparent to those of ordinary skill in the art in view of the detailed description of various embodiments, which is made with reference to the drawings, a brief description of which is provided below. The use of the same reference numeral in the drawings is utilized to denote identical or similar elements.

DETAILED DESCRIPTION

Various embodiments of this invention can be utilized. The drawings and descriptions of embodiments of the invention exemplify its principles and are not intended to limit the broad aspect of the invention to only the illustrated embodiments.

Figure 1:
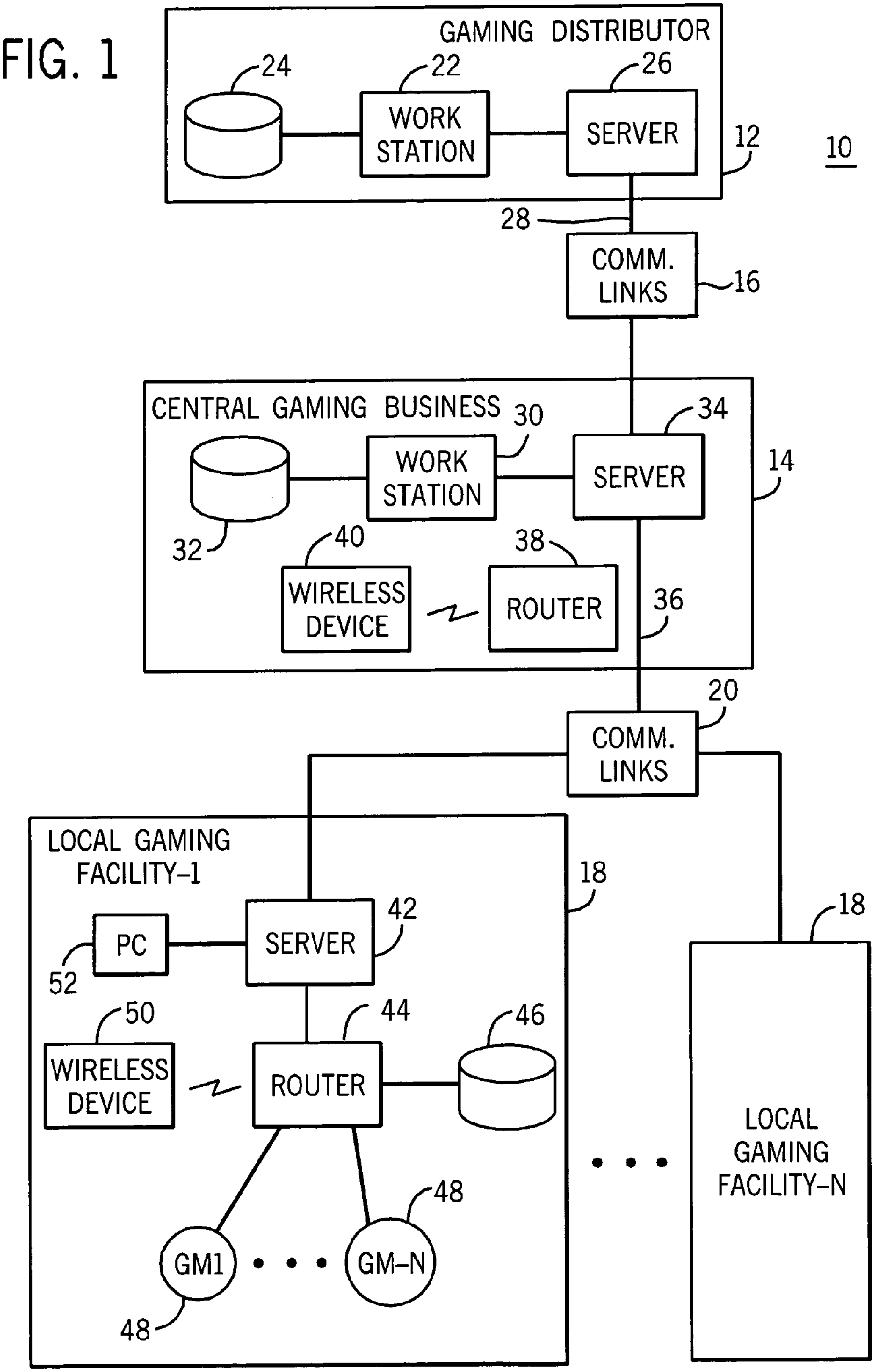
FIG. 1 is a block diagram of a gaming system embodying the present invention.

Referring to FIG. 1, an exemplary gaming system 10 includes a gaming distributor 12 coupled to a central gaming business 14 by communication links 16. Local gaming facilities 18 are connected by communication links 20 to the central gaming business 14. As used herein, "gaming" refers to the use of various games that support the placing of wagers on the outcome of the games, e.g. a video poker machine. The gaming distributor 12 may consist of the creator or distributor of games and/or gaming machines, e.g. WMS Industries Inc. The central gaming business 14 may consist of centralized operations for a casino or licensed gaming machine operator. The local gaming facilities 18 may consist of geographically separated locations, i.e. different casinos, all owned or controlled by the same central gaming business.

The gaming distributor 12 may include a computer workstation 22 coupled to a nonvolatile memory storage device 24 such as a hard drive. The workstation 22 is also coupled to a server 26 that provides a host for communications over communication channels 28. The workstation 22 may provide a plurality of functions that serve to support the gaming distributor. In accordance with this illustrative embodiment, one function of the workstation 22 is to provide support for the central gaming business 14. For example, the workstation 22 may cause an updated version of a software implemented game stored in device 24 to be downloaded by server 26 to the central gaming business 14 for storage and redistribution to the associated gaming machines at its local gaming facilities.

A central gaming business 14 includes a workstation 30 supported by data storage element 32 and a server 34 that serves as a communication host with the gaming distributor 12 and communication channels 36 coupled to the local gaming facilities 18. The server 34 also supports communication with a router 38 that in turn supports wireless communications with the wireless device 40 which may comprise a laptop computer, personal digital assistant, a data enabled cellular telephone, etc. The wireless device 40 permits users, e.g. administrators and operational personnel of the central gaming business, to receive information generated by workstation 30 as well as information concerning the local gaming facilities 18. It may be utilized to provide data input and instructions to workstation 30.

Each local gaming site 18 includes a server 42 that functions as a host of communications between the subject local gaming facility and the central gaming business 14 and the other local gaming facilities. A router 44 routes communications between the server 40 and other elements including data storage element 46, gaming machines 48 and a wireless communication link with a wireless device 50. The data storage element 46 can be utilized to store control information, gaming machine statistics and gaming programs and/or updates to gaming programs. For example, assume that gaming machines 48 at the subject local gaming facility are to be updated with a new version of a game. This new version may have been downloaded from the gaming distributor 12 by the central gaming business 14 and stored in data storage element 32. At an appropriate time under the control workstation 30, the new version is downloaded and stored by the data storage element 46 of each local gaming facility that contains a gaming machine 48 to receive the new version. At a convenient time such as determined by router 44, the new version stored in data element 46 will be downloaded into the memory of the appropriate gaming machines 48.

Alternatively, a new version of the game can be downloaded directly from the central gaming business 14 to the respective gaming machines 48. The wireless device 50 is similar to the previously described wireless device 40 and preferably supports bidirectional communications. However, in one exemplary embodiment, wireless device 50 is primarily utilized to display status information to gaming system managers concerning the status and utilization of the gaming machines 48 so that the managers are free to roam around the gaming facility. It will be noted that not all of the gaming machines at a particular local gaming facility may be capable of being remotely updated. Those skilled in the art will appreciate that new gaming machines may be designed with sufficient processing and communications ability to be able to be remotely updated and controlled without requiring intermediate processing such as provided by server 42 and router 44. Of course, a gaming system manager may utilize a personal computer 52 connected to server 42, or alternatively to router 44, to display gaming information and provide control instructions for the gaming machines 48 located at the same local gaming facility.

Figures 2, 3:
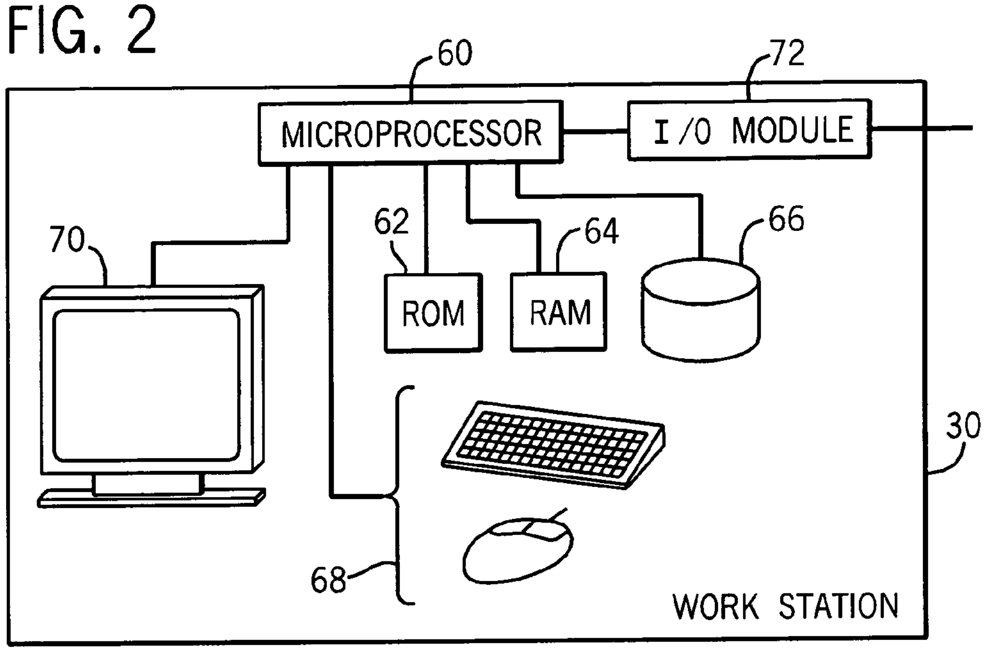
FIG. 2 is a block diagram of a workstation as shown in FIG. 1.
FIG. 3 is an exemplary table representing schedules for gaming machines.

FIG. 2 shows workstation 30 in more detail. It includes a microprocessor 60 that is supported by read-only memory (ROM) 62, random access memory (RAM) 64 and nonvolatile data storage element 66 such as a hard disk. As will be appreciated by those skilled in the art, ROM 62 stores boot-up control instructions and information for microprocessor 60, and RAM 64 normally stores application control instructions and data obtained from data storage element 66 and/or ROM 62 associated with the implementation and running of an application program. Input devices 68 such as a keyboard and/or mouse and an output device 70 such as a monitor are typically coupled by corresponding support modules (not shown) to microprocessor 60 enabling a user to provide inputs and observe displayed information. An input/output (I/O) module 72 is coupled to microprocessor 60 and enables bidirectional communications between the microprocessor and external devices thereby allowing the module to transmit instructions to the various gaming machines. The microprocessor and required supporting elements forms a microprocessing unit.

Workstation 30, operating under the control of application software that will be explained in more detail below, supports schedules controlling modifications of the operation of remotely reconfigurable gaming machines wherein the schedules are independent of specific gaming machines to be modified. Being "independent" of specific gaming machines means that a schedule can be created without requiring the identification of specific gaming machines to which the schedule will be applied, and that gaming machines can be added to or canceled from a set of gaming machines to be controlled by a schedule without requiring a change to the schedule itself. This provides a game system manager with increased flexibility and convenience in being able to create and modify schedules.

Gaming Machine Scheduling

FIG. 3 shows an exemplary table 100 that may be stored in workstation 30 and is representative of schedules for controlling gaming machines with attributes as described above. Exemplary table 100 includes rows 102, 104 and 106 and columns 108, 110, 112, 114, 116 and 118 where each row and column intersect to define a value that can be stored in memory by workstation 30. Each of the rows represents a different schedule that is identified by a schedule number (#) in column 108. For example, row 102 contains values associated with schedule #31 including a schedule name and/or description "Recurring Weekday #1" in column 110, an identification of the type of game "G7" in column 112, additional parameters 1-N representing controllable aspects of the game, e.g. coin denomination, maximum number of coins that can be bet, pay table, in columns 114 and 116, and the date "D" and time "T" during which the schedule is to be in effect in column 118. These various parameters, functions, revisions or updates to games as well as the game to be played are all referred to herein as "gaming actions". It will be noted that the identification of the game in column 112 merely represents the type of game to be implemented by the schedule, and does not correspond or identify specific gaming machines to be associated with the schedule.

Figure 4:
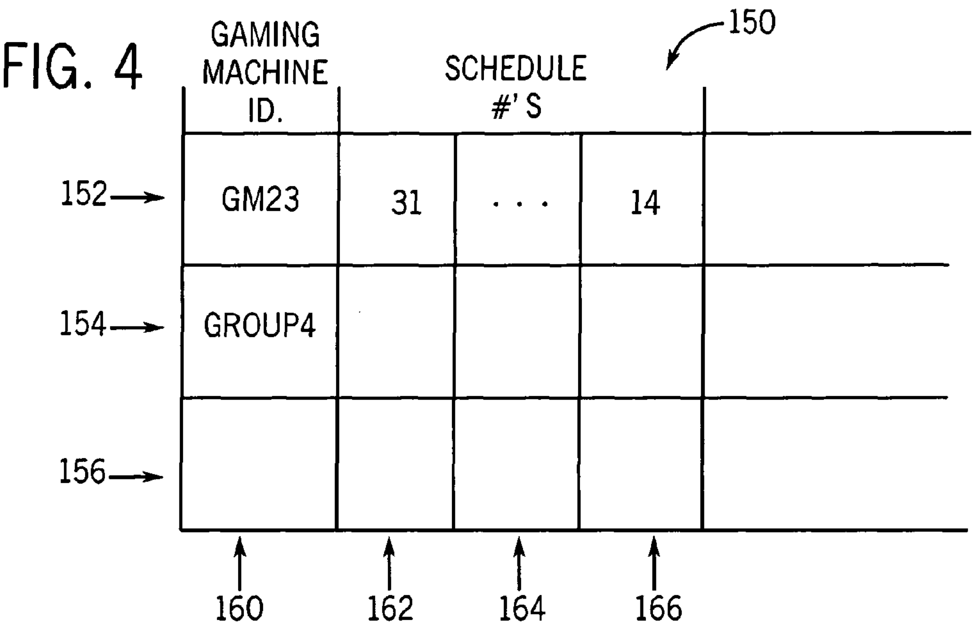
FIG. 4 is an exemplary table representing the linking of gaming machines to the schedules.

FIG. 4 shows an exemplary table 150 that may be stored in workstation 30 and is representative of a listing of gaming machines associated with the schedules. The table 150 includes rows 152, 154 and 156 and columns 160, 162, 164 and 166 where each row and column intersect to define a value that can be stored in memory by workstation 30. In this exemplary embodiment, each row identifies a gaming machine or a predetermined group of gaming machines in column 160 with the other columns in the same row identifying schedules to be implemented by the gaming machine. For example, row 152 identifies that gaming machine 23 (GM23) is to operate in accordance with schedules 31 and 14 corresponding to columns 162 and 166, respectively. It will be apparent that additional schedules can be assigned to a gaming machine by increasing the number of corresponding columns. The value at row 154 and column 160 defines that a predetermined set of like-type of gaming machines (Group 4) are to operate under the control of schedules identified with that row.

Although table 150 is organized with each row associated with one gaming machine or group of gaming machines, it will be apparent that the table could be based on each schedule with the plurality of gaming machines to be controlled by the schedule being listed as associated with the schedule. Tables 100 and 150 are intended to be merely illustrative of an exemplary implementation. Those skilled in the art will appreciate that the information illustrated as being stored in the tables could be stored in memory locations of workstation 30 in other formats, e.g. vectors, records in a database, etc., in order to accomplish the principles as described herein. Values stored in columns 162-166 act as pointers (memory address locations) and serve to link the identities of the schedules to be associated with each gaming machine. However, such linkage could also associate with each schedule a set of pointers to gaming machines that are to follow the subject schedule. Because of such linkage, independence between the schedules and the gaming machines provides improved flexibility of creating and modifying schedules and gaming machines subject to the schedules.

Figure 5:
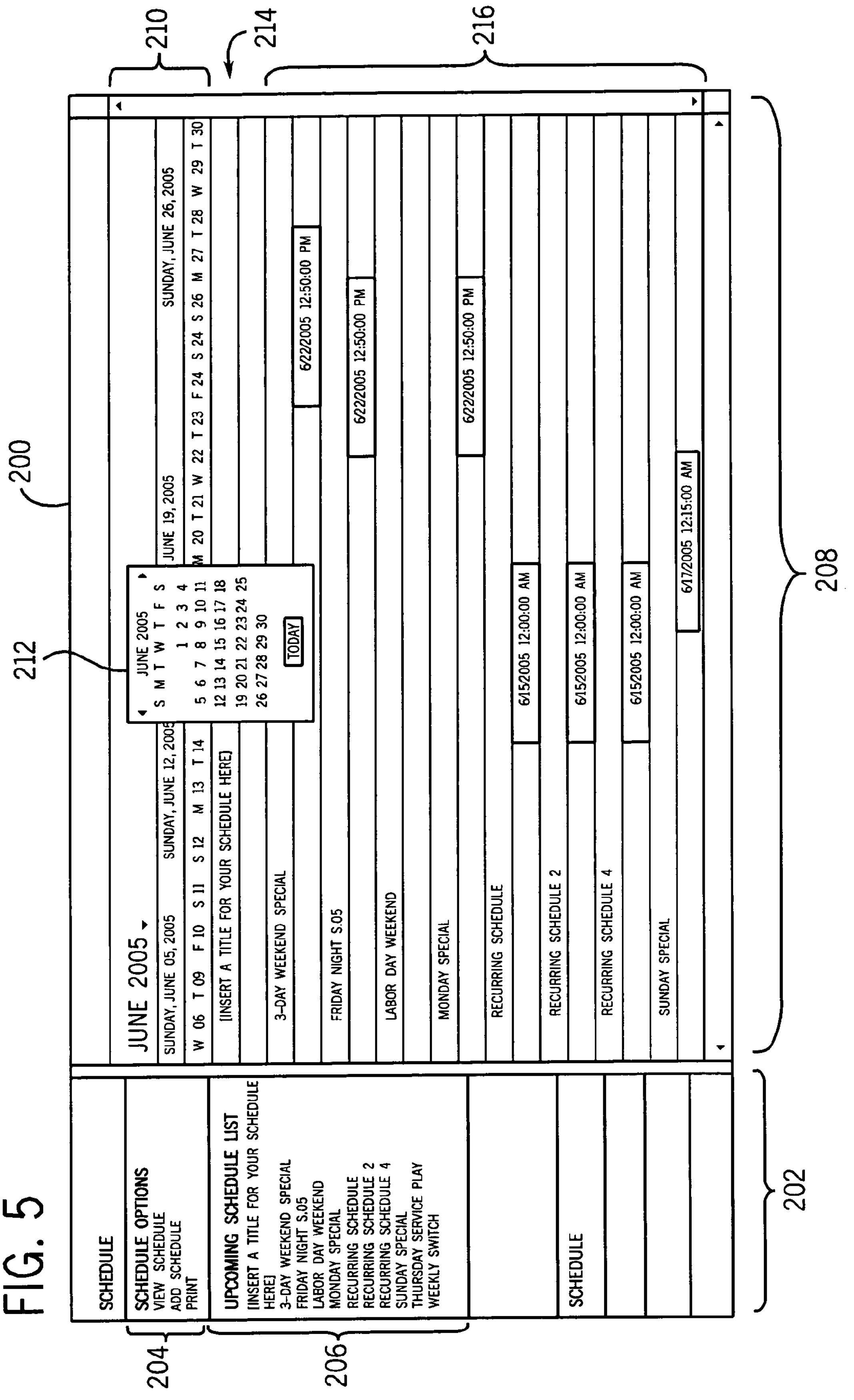
FIG. 5 is an illustrative screen display of a graphical user interface for administering schedules.

FIG. 5 shows a screen display of a graphic user interface for creating and modifying schedules as well as identifying gaming machines to be associated with each schedule. A left window portion 202 includes a list 204 of selectable "Schedule Options" and a list 206 of selectable "Upcoming Schedule List" in which appears a listing of previously created schedules. A right window portion 208 contains an upper portion 210 containing selectable dates with an inner window 212 showing "June 2005" being open and having a selectable "Today" button available for selection. In line 214 of window portion 208, the label "Insert a Title for Your Schedule Here" provides a selectable option for the user to establish a name/title for a new schedule. The lines in section 216 of the window portion 208 lists previously created schedules, some of which have been activated as indicated by the dates and times listed in a line below the schedule entries.

Figure 6:
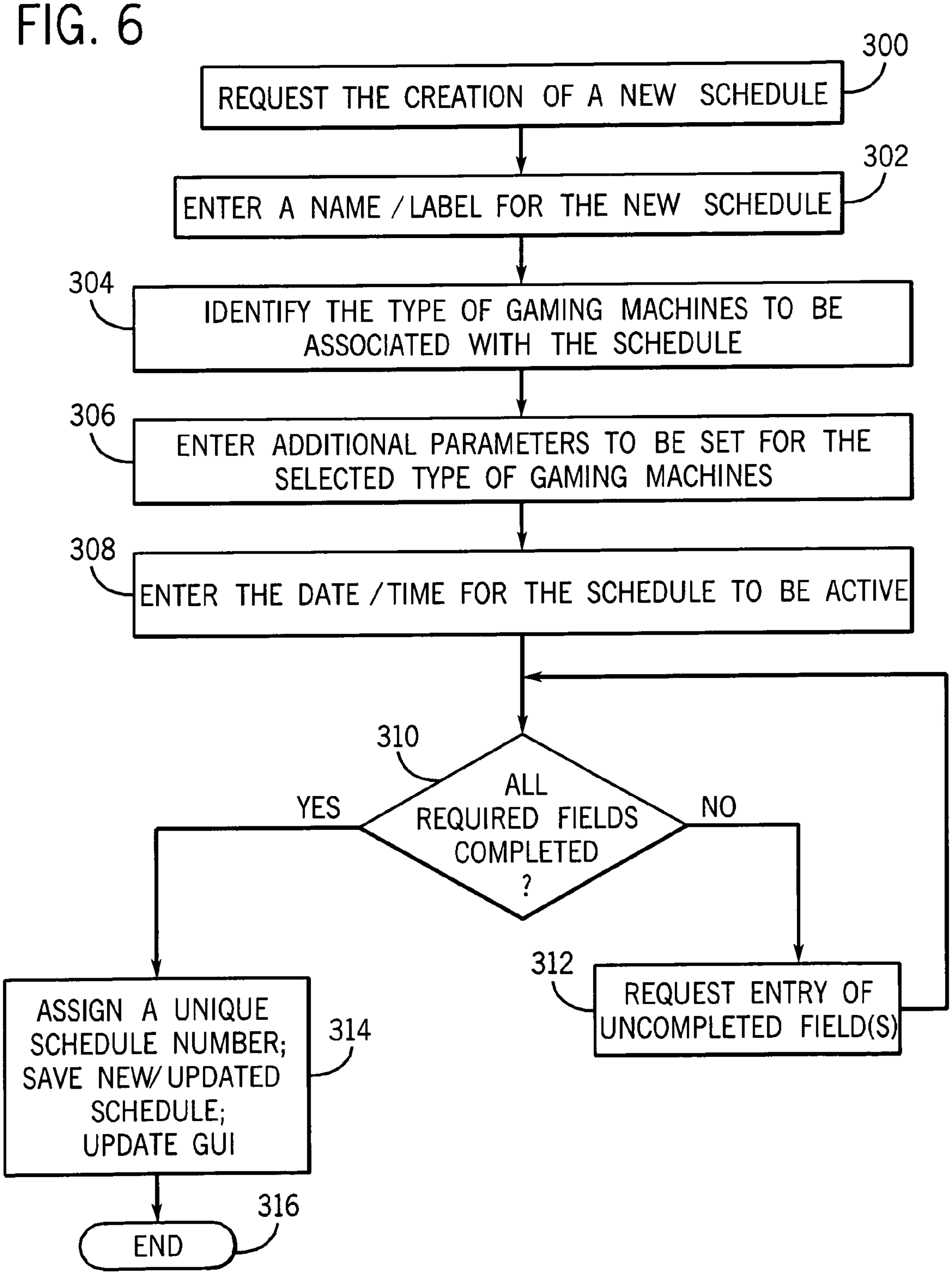
FIG. 6 is a flow diagram of exemplary steps for creating a schedule.

FIG. 6 illustrates exemplary steps for the creation of a schedule. In step 300 a request is made for the creation of a new schedule. This request can be made by utilizing the GUI of FIG. 5 whereby the user selects "Add a Schedule". In accord with step 302 the user enters a name or label for the new schedule such as by typing in a name in an indicated input area on the screen. This corresponds to the information of column 110 of FIG. 3. In step 304 the user identifies the type of gaming machines to be associated with the schedule; see column 112 of FIG. 3. For example, a type of gaming machine may consist of a particular type of video poker gaming machine. In step 306 the user enters, or is prompted to enter, additional parameters to be set for the selected type of gaming machine; see columns 114-116 of FIG. 3. In step 308 the user enters or identifies a date/time during which the schedule will be active; see column 118 of FIG. 3. A determination is made by the computer program as to whether all required fields have been completed by the user in step 310. A NO determination by step 310 results in the user being prompted to enter any uncompleted fields, and following the entry of any uncompleted fields, the process returns to the input of step 310 to again check for the completion of all fields required for a new schedule. The YES determination by step 310 results in actions by step 314 in which a unique schedule number is assigned by the computer program to the entered schedule. Then, the new or update schedule is saved to memory and the GUI is updated to reflect the availability of a new schedule. This process terminates at END 316. In an exemplary embodiment, these steps are supported by software running on workstation 30.

Although the above process was explained with regard to the entry of a new schedule, a similar process is utilized for the modification of an existing schedule in which an existing schedule is selected by the user for modification followed by some or all of the fields in the schedule being modified by the user.

Figure 7:
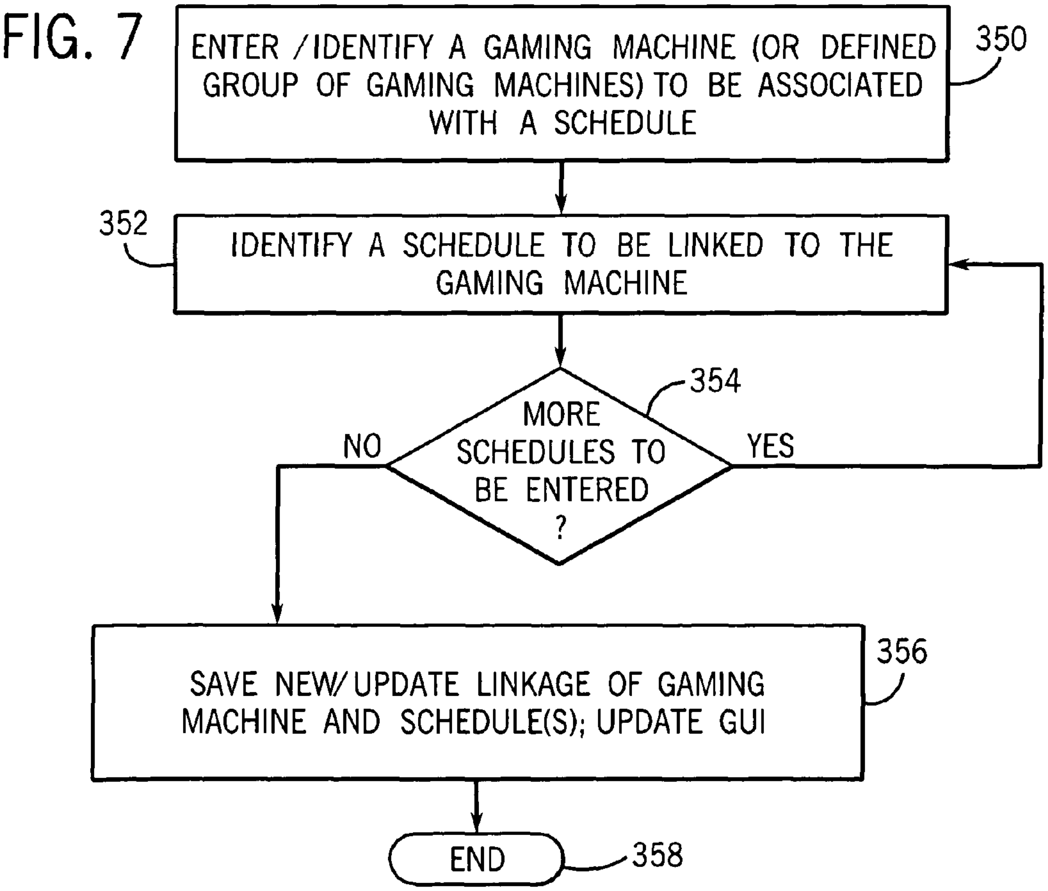
FIG. 7 is a flow diagram of exemplary steps for linking gaming machines and schedules.

FIG. 7 illustrates steps by which a gaming machine (or a label identifying a predetermined group of gaming machines) is identified to be associated with a schedule. In step 350 the user enters or identifies the gaming machine be associated with one or more schedules. For example, the user may be provided by the application software with a prompt to type in the identity of gaming machine. Alternatively, user may be allowed to select a previously known gaming machine such as by highlighting one gaming machine from a presented list of gaming machines, or identifying a gaming machine by clicking on an icon associated with the desired gaming machine. In step 352 a schedule is identified to be linked to the identified gaming machine. The schedule can be identified by the user based on the assigned schedule number or the name of the schedule. Similarly, the user may be offered the opportunity to type in the specific information or allowed to select the schedule from a listing of schedules or icons representing schedules. A determination is made in step 354 of whether more schedules are to be entered. For example, such a query may be displayed for answer by the user. A YES determination my step 354 returns processing to step 352 for the entry of additional schedule to be associated with the selected gaming machine. A NO determination by step 354 results in step 356 saving the new or updated linkage of gaming machines and schedules to memory, and then updating the GUI reflect the corresponding schedule and gaming machine associations. In an exemplary embodiment, these steps are implemented by software running on workstation 30. This process terminates at END 358.

Although the above process was explained with regard to the association of one or more schedules with a gaming machine, a similar process can be utilized for the modification of an existing association of gaming machines and schedules in which an existing association is selected from modification by the user. Alternatively, game machine behaviors/configurations can be created/modified by using drag and drop GUI techniques with visual objects corresponding to existing, pre-configured game machine behaviors/configurations being dragged and dropped onto the icon of the game machine to be modified.

The execution of the schedules can vary as to implementation. Assuming that the schedules and gaming machine associations with the schedules are stored in workstation 30 at the central gaming business 14, workstation 30 can periodically compare the current date and time with the dates and times stored with each schedule. The "date" may be a day of the month, e.g. June 23, or a day of the week, e.g. Thursday. A short time before a schedule is to be implemented, the workstation 30 can download directly to each gaming machine or to local storage 46 at each local gaming facility the game, game revision or modifications of parameters of an existing game for implementation on the gaming machines that are the subject of the schedule. The actual implementation of the scheduled actions by the gaming machine can be initiated by a signal transmitted from workstation 30 to the corresponding gaming machines or router 44, or can be self initiated by at the local gaming facility by the router or each gaming machine at the scheduled time.

Conveying Gaming Machine Status Information

In accordance with another embodiment, status information concerning each of a plurality of gaming machines is simultaneously displayed to an operator. In a preferred embodiment a representative two-dimensional top view of a floor of a casino is displayed with the location of each gaming machine on the floor being represented as an icon. Indicia of each icon is automatically updated, preferably in substantially real-time, to reflect the status of information selected by the operator. For example, the operator may desire to see a representation for each gaming machine of the amount of play during the last hour, i.e. the total wagering for each gaming machine during the last hour. Such information displayed on a screen as different indicia for each gaming machine can provide the operator with a quick and convenient overview of the productivity of the gaming machines. This enables the operator to quickly identify gaming machines that may be experiencing an operational problem as well as identifying the types of gaming machines that are experiencing the most play.

Figure 8:
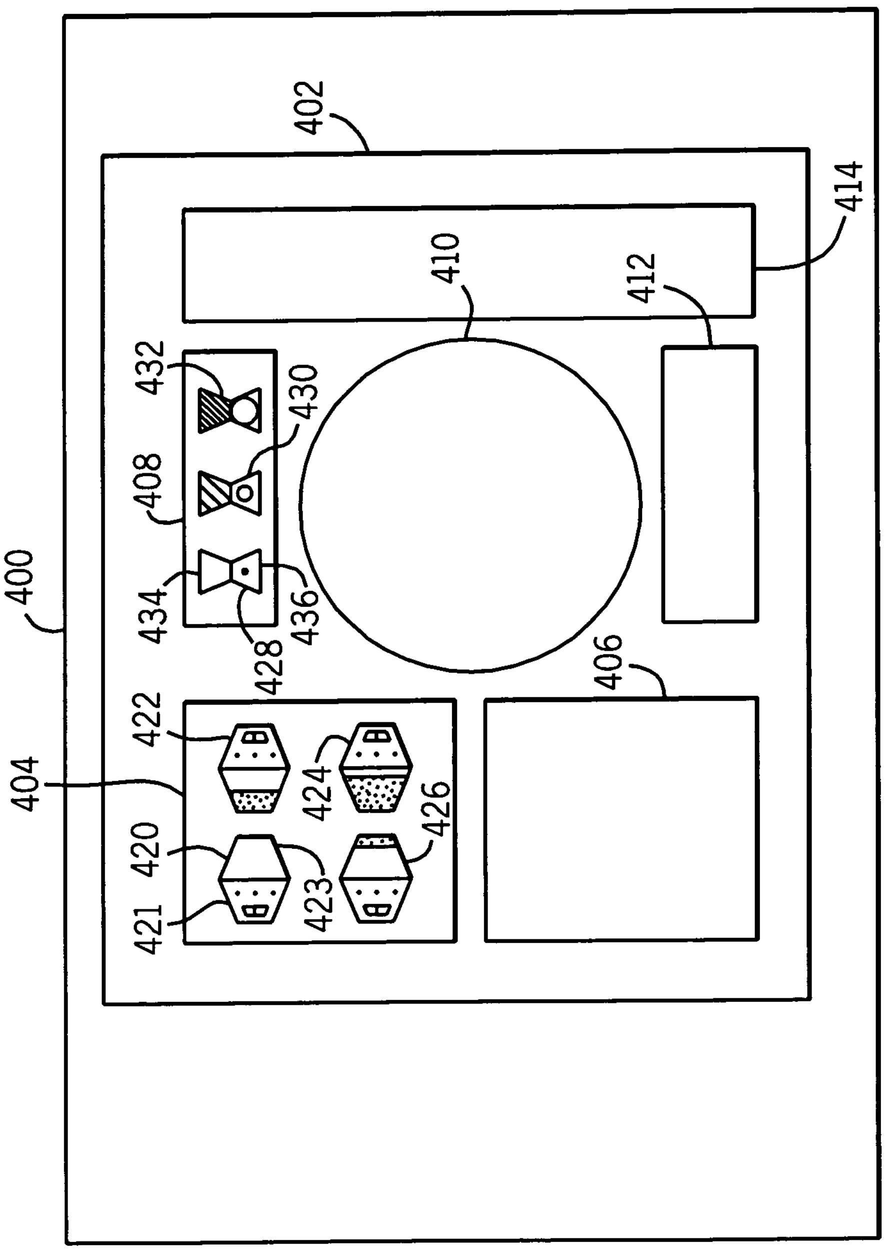
FIG. 8 is an illustrative screen display of a graphical user interface for depicting icons representing the status of gaming machines.

Referring to FIG. 8, a window 400 is displayed on a screen for viewing by a gaming system operator or gaming management. Although the information to be displayed is preferably collected by workstation 30, the information may be displayed on the monitor 70 of the workstation or conveyed to the screen of a wireless device 40 or 50, or to a screen associated with PC 52. Area 402 displayed within window 400 represents a scaled top view of the floor of the casino. Located on the floor are a plurality of clusters of different geographic configurations of gaming machines represented correspondingly on the screen as clusters 404, 406, 408, 410, 412 and 414. Preferably, different icons are utilized to depict different types of gaming machines. The gaming machines on the floor of the casino can be shown in 2-dimensional or 3-dimensional representations.

For purposes of illustration, gaming machines are only illustrated within clusters 404 and 408. It will be understood that each of the clusters will typically contain icons representative of the corresponding gaming machines located within each cluster. Icons 420, 422, 424 and 426 represent four corresponding gaming machines, respectively. In the exemplary icon 420, the icon consists of a top section 421 that identifies the type of gaming machine and a bottom section 423 that can contain different indicia that is representative of information sought by the operator. Assume that the operator desires to see information as to the relative amount of play during the last hour. The icon 420 indicates, by the bottom portion 423 being empty, that the corresponding gaming machine has experienced substantially little play, either little play compared to other similar gaming machines or little absolute play as desired. Icon 422 indicates, by its bottom portion being approximately 50% filled, that the corresponding gaming machine is experiencing average play. Icon 424 indicates, by its bottom portion being approximately 90% filled, that the corresponding gaming machine is experiencing near the highest play. Icon 426 indicates, by its bottom portion being approximately 20% filled, that the corresponding gaming machine in experiencing relative play of about 20% relative to the heaviest played gaming machine. This graphically rendered information provides an operator or a manager with meaningful information that can be readily understood and utilized to make changes if needed. Because this information is displayed to the operator for each of the gaming machines on a floor or designated area at the same time, the operator can immediately identify relative levels of performance of the various gaming machines and initiate corrective action which may be required for substantially under performing gaming machines.

It will be understood that various shapes and types of icons as well as indicia associated with each can be utilized. For example, icons of different geometric shapes, styles or colors can be utilized to distinguish different types of gaming machines. Likewise, a variety of different indicia associated with each icon can be utilized to convey the desired information to the operator. For example, various characteristics of indicia such as different levels of filling, shading, crosshatching, colors, size, etc. can be utilized to convey different conditions and parameters. Miniature thumb-nail visual representation icons that differ for each type of game machine can be used to easily distinguish each game machine on the floor including how each is configured for a game theme. Status bars associated with each icon can convey the desired condition and parameters of the represented game machine. The information to be visually conveyed, e.g. machine state, win/loss outcomes, spinning reels, physical sensor indicators, communication status, etc., can be collected and displayed in substantially real-time if desired.

Two or more different types of characteristics of indicia can be concurrently displayed on a single icon in order to simultaneously represent two or more corresponding types of information. For example, the amount of play experienced by a gaming machine does not automatically equate to the amount of profit being generated by the gaming machine. A gaming machine with a relatively low coin denomination that experiences relatively heavy play may yield a profit that is less than a gaming machine with a high coin denomination that is experiencing only average play. Hence, an operator may desire to simultaneously observe for at least a group of gaming machines (and hence each corresponding icons) the amount of game play and the relative profit being yielded for a unit of time. Such a desire can be accommodated in accordance with an embodiment of the present invention by utilizing two different types of indicia displayed simultaneously with an icon. This is illustrated by icons 428, 430 and 432. For example, the amount of game play is represented by the size of a circle in the bottom section 436 of these icons. A continuous range of values of parameters being monitored (amount of game play) is represented by corresponding sizes of circles in the bottom portion of each icon, with a small circle or dot in icon 428 representing a very small value, the intermediate size circle in icon 430 representing an intermediate value and the large circle substantially filling the bottom of icon 432 representing a large or maximum value of game play. Simultaneously, the top section 434 of each of these icons contains variable indicia that represents the profit being yielded by each corresponding gaming machine, e.g. no shading lines in icon 428 indicating very low or no profit being yielded, the moderate amount of shading lines in icon 430 indicating moderate profit being yielded and the heavy amount of shading lines in icon 432 indicating large or maximum profit being yielded. Of course, various other characteristics of indicia could be used to represent a continuous range of parameters being monitored, e.g. the color of an icon can be varied to over a spectrum of colors ranging from darker colors (black, dark blue, etc.) representing low parameter values, and more brilliant colors (red, yellow, etc.) representing higher values. Thus, the operator can simultaneously observe and easily understand two or more parameters for each gaming machine based on different types of indicia displayed with or on an icon. Preferably, a key identifying the parameters represented by each type of indicia is simultaneously displayed on the window with the icons, or alternatively is made available to be displayed to the operator if desired. Alternatively, each icon could be configured to automatically bring a pop-up inner window or data on the screen containing the desired information (or more detailed data) about the associated game machine upon a mouse pointer being hovered over the corresponding icon. Further, an icon representing a game machine or an area of game machines could "shake" (move among a plurality of adjacent screen locations) periodically or continuously in order to alert the user that attention is required if collected data associated with the game machine of the icon does or does not meet predetermined values. Also, game machines or groups of game machines of the same theme can be utilized as described above or combined with other existing floor performance systems into one integrated interface.

Figure 9:
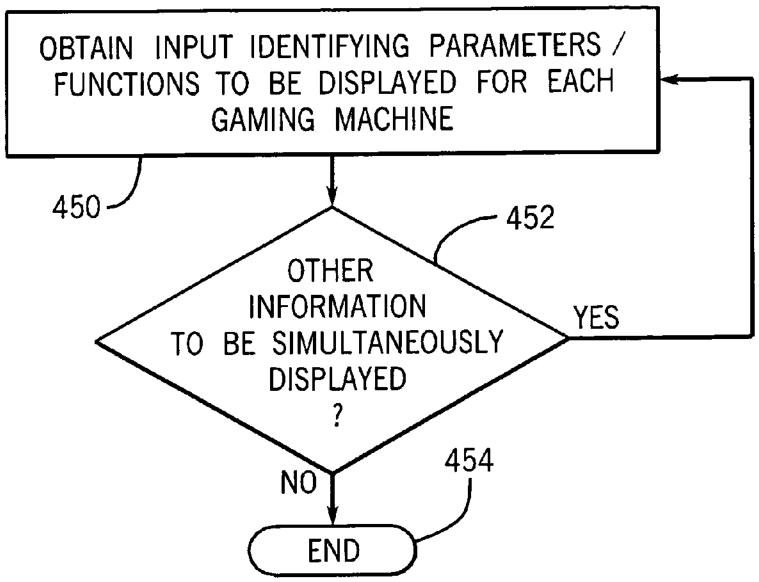
FIG. 9 is a flow diagram of exemplary steps for selecting information about gaming machines to be represented by indicia of icons corresponding with the gaming machines.

FIG. 9 shows exemplary steps associated with determining which parameters/functions are to be displayed as information utilizing indicia of icons representing the gaming machines. In step 450, input identifying parameters/functions to be displayed for each gaming machine is obtained. This may comprise an operator selecting from a list of parameters and functions for which information can be monitored. In step 452 a determination is made of whether other information is to be simultaneously displayed, i.e. whether different types of indicia for the same icon will be utilized. A YES determination by step 452 returns processing to step 450 which collects information concerning the additional parameter/function to be monitored. A NO determination by step 452 results in termination of the process at END 454.

Figure 10:
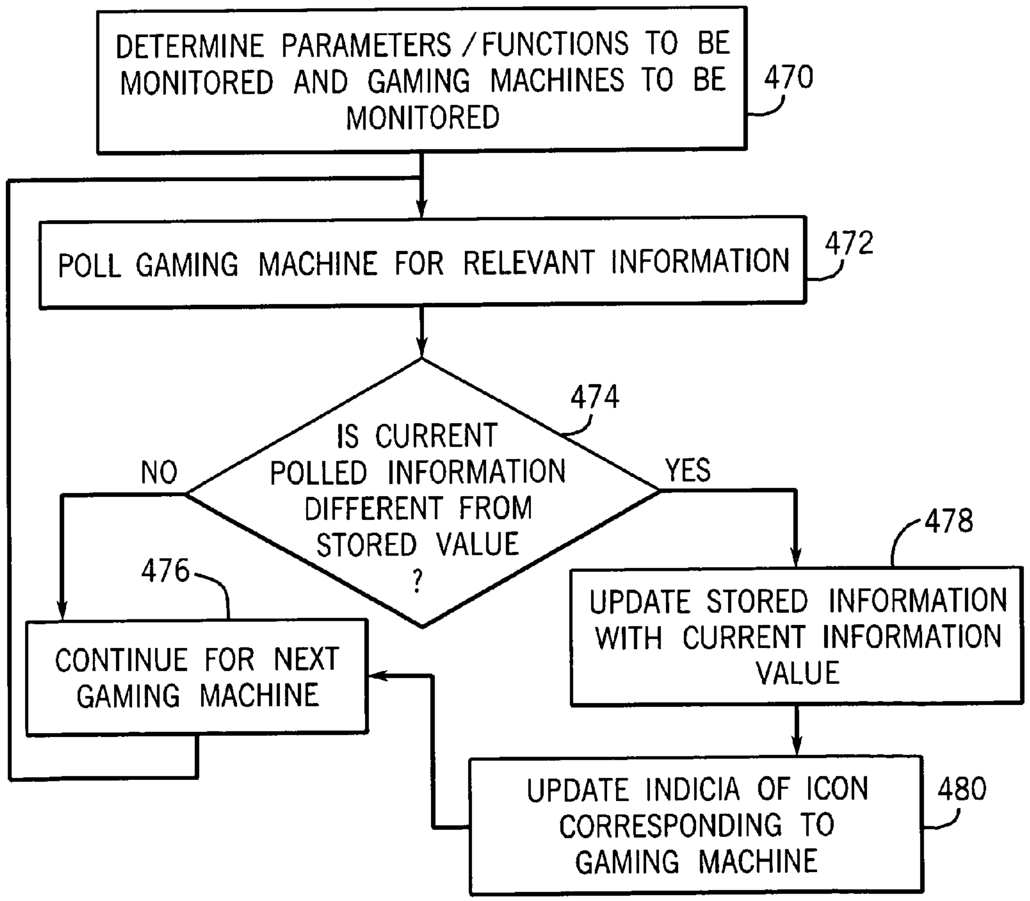
FIG. 10 is a flow diagram of exemplary steps for obtaining and displaying substantially real-time information about parameters of gaming machines.

Referring to FIG. 10, exemplary steps are illustrated for monitoring gaming machines and updating indicia on corresponding icons to reflect current information with regard to parameters and functions being monitored. In step 470 the parameters and/or functions to be monitored are determined as well as the gaming machines which are to be monitored. The parameters and functions to be measured and the gaming machines to be monitored as obtained in step 450 of FIG. 9 are preferably stored in memory and can be retrieved. In accordance with step 472, a gaming machine to be monitored is polled for relevant information. In a preferred embodiment, workstation 30 is utilized as a primary element in implementing the steps of FIGS. 9 and 10, and hence workstation 30 transmits queries to the respective gaming machines which respond with the relevant requested information. In step 474 a determination is made if the current polled information is different from the previously stored information, i.e. is the previously stored value different from the currently returned value from the gaming machine for the same corresponding parameter/function? A NO determination by step 474 causes step 476 to continue to the next gaming machine being monitored. This causes the process to return to the input of step 472 in which the next gaming machine in a list of gaming machines is identified to be polled. The YES determination by step 474 results in step 478 updating the stored information corresponding to a parameter/function to be monitored with the current information value for the subject gaming machine. In step 480 the indicia is updated on the icon corresponding to the gaming machine having been updated. This provides the operator viewing the screen with the displayed icon with indicia that automatically updates in substantially real-time without requiring an update request to be entered by the operator. As used herein "substantially real-time" updates refers to the ability to periodically refresh an icon's indicia at least once a minute and preferably every 30 seconds. Following step 480, processing returns to the input of step 476, the action of which has been explained above. It will be noted that the process as described with regard to FIG. 10 forms an endless loop in which gaming machines are continually polled and the indicia associated with icons corresponding to the gaming machines automatically refreshed.

Although workstation 30 is described above as directly querying the gaming machines to obtain the relevant parameter/functions being monitored, those skilled in the art will appreciate an alternative embodiment in which router 44 at the local gaming facility collects the relevant information from the local gaming machines and in turn passes this information to workstation 30. This embodiment includes the advantage of minimizing traffic on the communication channels since the relevant information for all gaming machines located in a local gaming facility can be collected and returned as a group, i.e. a single transmission, by router 44 to workstation 30. In still another embodiment, router 44 may include sufficient processing capability and functionality at each local gaming facility to monitor and control the indicia for each icon to be displayed for gaming machines located at the local gaming facility to an operator utilizing PC 52 or wireless device 50.

The attachment appended hereto following the abstract provides additional information about the embodiments described above and further information about the operation and features of the GUI.

Each of these embodiments and obvious variations thereof is contemplated as falling within the spirit and scope of the claimed invention, which is set forth in the following claims.

What is claimed is:

1. A computer-implemented method of managing and implementing wagering game schedules in a casino environment, the method comprising:

storing, in a first data structure, a first list of schedules of game actions, each schedule of the first list including at least a game identifier and a designated game time indicating one or more times the identified game is to be played;

storing, in a second data structure separate from the first plurality of memory locations, a second list of gaming machine identities, each gaming machine identity of the second list being uniquely associated with a respective gaming machine, and linking data connecting one or more schedules of the first list to one or more gaming machine identities of the second list, wherein the linking data connects the one or more schedules to the one or more gaming machine identities such that one or more of the one or more schedules can be modified independent of and without modifying the one or more gaming machine identities, and such that one or more of the one or more gaming machine identities can be modified independent of and without modifying the one or more schedules;

automatically comparing, via at least one of one or more processors, a current time with the designated game times of the one or more schedules; and automatically transmitting, via at least the one of one or more processors and prior to the designated game times, instructions based on the currently stored first list, the currently stored second list, and the currently stored linking data, to the one or more gaming machines associated with the one or more gaming machine identities, the transmitted instructions, when executed by at least one of the one or more processors, causing the one or more gaming machines to play games identified by the one or more schedules at the designated game times.

2. The method of claim 1, wherein the linking data comprises a first memory address in the first data structure.

3. The method of claim 1, wherein the linking data comprises a second memory address in the second data structure.

4. The method of claim 1, wherein each schedule of the first list further comprises a plurality of modifiable action fields containing one or more additional game actions to be implemented at the designated game time.

5. The method of claim 4, wherein the one or more additional game actions include one or more of a coin denomination, maximum bet, and pay table.

6. The method of claim 1, wherein the linking data is further stored in a third data structure, the third data structure comprising one or more third memory addresses located on a game server on a communications network.

7. The method of claim 1, wherein the one or more gaming machine identities are less than all of the gaming machine identities of the second list of gaming machine identities, wherein the remaining gaming machine identities of the second list are not linked to schedules of the first list, and wherein the gaming machines associated with the remaining gaming machine identities of the second list do not receive automatically transmitted instructions based on the first list of schedules.

8. The method of claim 1, wherein the one or more schedules of the first list of schedules are less than all of the schedules of the first list, and wherein the remaining schedules of the first list plurality are not linked to gaming machine identities of the second list and do not affect instructions transmitted to gaming machines of the second list.

9. The method of claim 1, further comprising:

receiving from a user, via at least one input device, new linking data connecting at least one schedule of the first list to at least one gaming machine identity of the second list, wherein the new linking data connects the at least one schedule to the at least one gaming machine identity such that the first list can be modified independent of and without modifying the second list and such that the second list can be modified independent of and without modifying the first list; and automatically transmitting, via at least one of the one or more processors and to the at least one gaming machine associated with the at least one gaming machine identity, new instructions based on the currently stored first list, the currently stored second list, and the new linking data, the transmitted new instructions, when executed by at least one of the one or more processors, causing the at least one gaming machine to play games identified by the at least one schedule at a designated game time.

10. The method of claim 9, wherein the new linking data further includes connecting additional gaming machine identities of the second list to the at least one schedule of the first list, wherein the new instructions are further automatically transmitted to the gaming machines associated with the additional gaming machine identities, and wherein the new instructions further cause each of the gaming machines associated with the additional gaming machine identities to play a game identified by the at least one schedule at a designated game time.

11. A gaming system configured to automatically update gaming machines according to stored schedules of game actions, the system comprising:

at least one input device;

one or more processors; and at least one memory device storing scheduling instructions that, when executed by at least one of the one or more processors, cause gaming system:

store, in a first data structure, a first list of schedules of game actions, each schedule of the first list including at least a game identifier and a designated game time indicating a time the identified game is to be played;

store, in a second data structure separate from the first data structure, a second list of gaming machine identities, each gaming machine identity of the second list being uniquely associated with a respective gaming machine, and linking data connecting one or more schedules of the first list to one or more gaming machine identities of the second list, wherein the linking data connects the one or more schedules to the one or more gaming machine identities such that one or more of the one or more schedules can be modified independent of and without modifying the corresponding one or more gaming machine identities, and such that one or more of the one or more gaming machine identities can be modified independent of and without modifying the corresponding one or more schedules;

automatically compare a current time with the designated game times of the one or more schedules; and automatically transmit, prior to the designated game times, update instructions based on the currently stored first list, the currently stored second list, and the currently stored linking data, to the one or more gaming machines associated with the one or more gaming machine identities, the update instructions, when executed by at least one of the one or more processors, causing the one or more gaming machines to play games identified by the first list at the designated game times.

12. The gaming system of claim 11, wherein the update instructions are transmitted via a communications network.

13. The gaming system of claim 11, wherein the one or more gaming machine identities are less than all of the gaming machine identities of the second list, wherein the remaining gaming machine identities of the second list are not linked to schedules of the first list and the gaming machines associated with the remaining gaming machine identities of the second list do not receive automatically transmitted update instructions based on the first list of schedules.

14. The gaming system of claim 11, wherein the one or more schedules of the first list are less than all of the schedules of the first list, and wherein the remaining schedules of the first list are not linked to the gaming machine identities of the second list and do not affect the update instructions transmitted to the gaming machines associated with the gaming machine identities of the second plurality.

15. The gaming system of claim 11, wherein the scheduling instructions further cause the one or more processors to:

receive from a user, via at least one of one or more input devices, new linking data connecting at least one schedule of the first list to at least one gaming machine identity of the second list, wherein the new linking data connects the at least one schedule to the at least one gaming machine identity such that the first list can be modified independent of and without modifying the second list and such that the second list can be modified independent of and without modifying the first list; and automatically transmit, to the at least one gaming machine associated with the at least one gaming machine identity, new update instructions based on the currently stored first list, the currently stored second list, and the new linking data, wherein the transmitted new update instructions, when executed by at least one of the one or more processors, cause the at least one gaming machine to play games identified by the at least one schedule at a designated game time.

16. The gaming system of claim 15, wherein the new linking data further includes connecting additional gaming machine identities of the second list to the at least one schedule, wherein the new update instructions are further automatically transmitted to the gaming machines associated with the additional gaming machine identities, and wherein the new update instructions further cause each gaming machine associated with the additional gaming machine identities to play a game identified by the at least one schedule at a designated game time.

17. A computer-readable, non-transitory medium storing executable scheduling instructions that, when executed by at least one of one or more processors, cause a gaming system to perform a method comprising:

storing, in a first data structure, a first list of schedules of game actions, each schedule of the first list of the game actions including at least a game identifier and a designated game time indicating one or more times the identified game is to be played;

storing, in a second data structure separate from the first plurality of memory locations, a second list of gaming machine identities, each gaming machine identity of the second list being uniquely associated with a respective gaming machine, and linking data connecting one or more schedules of the first list to one or more gaming machine identities of the second list, wherein the linking data connects the one or more schedules to the one or more gaming machine identities such that one or more of the one or more schedules can be modified independently of and without modifying the one or more gaming machine identities, and such that one or more of the one or more identities can be modified independently of and without modifying the one or more linked schedules;

automatically comparing a current time with the designated game times of the one or more schedules; and automatically transmitting, prior to the designated game times, update instructions based on the currently stored first list, the currently stored second list, and the currently stored linking data, to the one or more gaming machines associated with the one or more gaming machine identities, the transmitted update instructions, when executed by at least one of the one or more processors, causing the one or more gaming machines associated with the one or more gaming machine identities to play games identified by the one or more schedules at the designated game times.

18. The medium of claim 17, wherein the one or more gaming machine identities are less than all of the gaming machine identities of the second list, and wherein the remaining gaming machine identities of the second list are not linked to the schedules of the first list and the gaming machines associated with the remaining gaming machine identities do not receive automatically transmitted instructions based on the first list.

19. The medium of claim 17, wherein the one or more schedules of the first list are less than all of the schedules of the first list, and wherein the remaining schedules of the first list are not linked to the gaming machine identities of the second list and do not affect the update instructions transmitted to the one or more gaming machines associated with the one or more gaming machine identities.

20. The medium of claim 17, wherein the scheduling instructions further cause the gaming system to:

receive from a user, via at least one input device, new linking data connecting at least one schedule of the first list to at least one gaming machine identity of the second list, the new linking data connects the at least one schedule to the at least one gaming machine identity such that the first list can be modified independently of and without modifying the second list and such that the second list can be modified independently of and without modifying the first list;

automatically transmit, to the at least one gaming machine associated with the at least one or more gaming machine identity, new update instructions based on the currently stored first list, the currently stored second list, and the new linking data, the transmitted new update instructions, when executed by at least one or the one or more processors, causing the at least one gaming machine to play games identified by the at least one schedule at a designated game time.

21. The method of claim 1, further comprising:

after automatically transmitting the instructions, modifying and storing at least one of the first list, the second list, and the linking data, and automatically transmitting new instructions to gaming machines affected by the modified at least one first list, second list, or linking data, the new instructions based on the modified at least one first list, second list, or linking data and the unmodified others of the first list, second list, and linking data.

22. The method of claim 1, further comprising:

after automatically transmitting the instructions, receiving from a user, via at least one input device, at least one of an addition and a deletion that modifies the first list of schedules;

in response to a confirming input from the user, storing the modified first list in the first data structure; and automatically transmitting, via at least one of the one or more processors and to gaming machines affected by the at least one addition and deletion, new instructions based on the modified first list, the currently stored second list, and the currently stored linking data, the new instructions, when executed by at least one of the one or more processors, causing gaming machines associated with the gaming machine identities of the second list to play games in accordance with the modified first list.

23. The method of claim 1, further comprising:

after automatically transmitting the instructions, receiving from a user, via at least one input device, at least one of an addition and a deletion that modifies the second list of gaming machine identities;

in response to a confirming input from the user, storing the modified second list in the second data structure; and automatically transmitting, via at least one of the one or more processors and to gaming machines affected by additions in the modified second list, new instructions based on the currently stored first list, the modified second list, and the currently stored linking data, the new instructions, when executed by at least one of the one or more processors, causing gaming machine associated with the gaming machine identities of the modified second list to play games in accordance with the first list.

24. The gaming system of claim 11, wherein the scheduling instructions further cause the gaming system to:

after automatically transmitting the update instructions, receive, via at least one input device, modifications to at least one of the first list, the second list, and the linking data;

store the received modifications; and automatically transmit new update instructions to gaming machines affected by the modified at least one first list, second list, or linking data, the new update instructions based on the modified at least one first list, second list, or linking data and the unmodified others of the first list, second list, and linking data.

25. The gaming system of claim 11, wherein the scheduling instructions further cause the gaming system to:

after automatically transmitting the instructions, receive from a user, via at least one input device, at least one of an addition and a deletion that modifies the first list of schedules;

in response to a confirming input from the user, store the modified first list in the first data structure; and automatically transmit, to gaming machines affected by the at least one addition and deletion, new instructions based on the modified first list, the currently stored second list, and the currently stored linking data, the new instructions, when executed by at least one of the one or more processors, causing the gaming machines associated with the gaming machine identities of the second list to play games in accordance with the modified first list.

26. The gaming system of claim 11, wherein the scheduling instructions further cause the gaming system to:

after automatically transmitting the update instructions, receive from a user, via at least one input device, at least one of an addition and a deletion that modifies the second list of gaming machine identities;

in response to a confirming input from the user, store the modified second list in the second data structure; and automatically transmit, to gaming machines affected by additions in the modified second list, new update instructions based on the currently stored first list, the modified second list, and the currently stored linking data, the new update instructions, when executed by at least one of the one or more processors, causing the gaming machines associated with the gaming machine identities of the modified second list to play games in accordance with the first list.

27. The gaming system of claim 17, wherein the scheduling instructions further cause the gaming system to:

after automatically transmitting the update instructions, receive, via at least one input device, modifications to at least one of the first list, the second list, and the linking data;

store the received modifications; and automatically transmit new update instructions to any gaming machines affected by the modified at least one first list, second list, or linking data, the new update instructions based on the modified at least one first list, second list, or linking data and the unmodified others of the first list, second list, and linking data.

28. The medium of claim 17, wherein the scheduling instructions further cause the gaming system to:

after automatically transmitting the update instructions, receive from a user, via at least one input device, at least one of an addition and a deletion that modifies the first list of schedules;

in response to a confirming input from the user, store the modified first list in the first data structure; and automatically transmit, to gaming machines affected by the at least one addition and deletion, new instructions based on the modified first list, the currently stored second list, and the currently stored linking data, the new instructions, when executed by at least one of the one or more processors, causing gaming machines associated with the gaming machine identities of the second list to play games in accordance with the modified first list.

29. The medium of claim 17, wherein the scheduling instructions further cause the gaming system to:

after automatically transmitting the update instructions, receive from a user, via at least one input device, at least one of an addition and a deletion that modifies the second list of gaming machine identities;

in response to a confirming input from the user, store the modified second list in the second plurality of memory locations; and automatically transmit, to the gaming machines affected by an addition in the second list, new instructions based on the currently stored first list, the modified second list, and the currently stored linking data, the new instructions, when executed by at least one of the one or more processors, causing gaming machine associated with the gaming machine identities of the modified second list to play games in accordance with the first list.

* * * * *

UNITED STATES PATENT AND TRADEMARK OFFICE

CERTIFICATE OF CORRECTION

PATENT NO. : 8,678,919 B2
APPLICATION NO. : 11/991392
DATED : March 25, 2014
INVENTOR(S) : Blackburn et al.

It is certified that error appears in the above-identified patent and that said Letters Patent is hereby corrected as shown below:

In the Claims:

On Column 11, Line 48 (Claim 8, Line 4), please delete the word “plurality.”

Signed and Sealed this
Fifteenth Day of July, 2014

Michelle K. Lee

Michelle K. Lee
*Deputy Director of the United States Patent and Trademark Office*

UNITED STATES PATENT AND TRADEMARK OFFICE

CERTIFICATE OF CORRECTION

PATENT NO. : 8,678,919 B2
APPLICATION NO. : 11/991392
DATED : March 25, 2014
INVENTOR(S) : Blackburn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1169 days.

Signed and Sealed this
Twenty-ninth Day of September, 2015

Michelle K. Lee
*Director of the United States Patent and Trademark Office*